United States Patent [19]
Kubo et al.

[11] 4,108,776
[45] Aug. 22, 1978

[54] FILTER PRESS
[75] Inventors: Masayoshi Kubo; Hideaki Katayama, both of Nagasaki, Japan
[73] Assignee: Mitsubishi Jukogyo Kabushiki Kaisha, Tokyo, Japan
[21] Appl. No.: 826,822
[22] Filed: Aug. 22, 1977
[51] Int. Cl.² .............................................. B01D 25/12
[52] U.S. Cl. ..................................... 210/224; 210/230
[58] Field of Search ........................ 210/224, 225, 230
[56] References Cited
U.S. PATENT DOCUMENTS

| 1,330,332 | 2/1920 | Miller | 210/224 |
| 3,622,005 | 11/1971 | Kurita | 210/225 |
| 3,807,567 | 4/1974 | Iwatani | 210/225 |

Primary Examiner—John Adee
Attorney, Agent, or Firm—Wenderoth, Lind & Ponack

[57] ABSTRACT

In a filter press having filter frames arranged parallel to each other so that they may be opened and closed, a liquid-feed metallic member, positioned at a side portion of the filter frame for feeding liquid to be processed to each filter chamber formed between adjacent filter frames, is fixedly secured to one of two links pivotably mounted with pins onto the respective adjacent filter frames in such manner that in response to opening and closing of the filter frames the liquid-feed metallic member may be automatically engaged with and disengaged from recessed portions of the filter frames. These recessed portions communicate with said filter chamber via filter cloths.

2 Claims, 5 Drawing Figures

FILTER PRESS

The present invention relates to a filter press, and more particularly, to means for automatically engaging and disengaging a member for feeding liquid to be processed with and from a filter chamber in the filter press in response to the closing and opening thereof.

Heretofore, in a diaphragm compression type filter press, since separability of filtered lees from a filter cloth is poor because of the method of dehydration, the mud feed system was, in general, principally of filter-cloth running type. In addition, because a diaphragm is mounted, it was difficult to employ a center feed system, and therefore, other systems were employed such that (I) an ear is provided at an upper portion of a filter frame and mud is feed through said ear, or (II) a mud-feed metallic member that is separated from a filter frame but can be displaced in conjunction with the filter frame as operated from the outside, is associated to the filter frame. However, in the aforementioned system (I) it is necessary to mount a liquid-feed auxiliary part on a filter cloth. However, this auxiliary part cannot be a heavy metallic part because it is mounted on a filter cloth. Accordingly, in general, synthetic resin is used for that part, but breakdown of the auxiliary part is caused frequently by the fastening force for the filter frame. In order to avoid such disadvantage it is necessary to work on the filter cloth. On the other hand, in the above-referred system (II), since the positions of the filter frame and the mud-feed metallic member are isolated from each other, relative positioning between an insert port on the filter frame side for the mud-feed metallic member and the mud-feed metallic member is difficult, and sometimes the difficulty causes ejection of the mud to the outside upon compression of the mud.

SUMMARY OF THE INVENTION

The present invention has been proposed for the purpose of eliminating the aforementioned disadvantages in the prior art, and it is a principal object of the present invention to provide a filter press which is so simple in structure that it does not impede running of a filter cloth, and which can be reliably fed with mud without hindering the opening and closing operations of the filter frames.

According to one feature of the present invention a filter press is provided which has filter frames arranged parallel to each other so that they may be opened and closed and is characterized in that a liquid-feed metallic member positioned at a side portion of the filter frame for feeding liquid to be processed to each filter chamber formed between adjacent filter frames is fixedly secured to one of two links pivotably mounted with pins on the respective filter frames. The metallic member is provided in such manner that in response to closing and opening of the filter frames said liquid-feed metallic member may be automatically engaged with and disengaged from recessed portions of the filter frames the recessed protions communicating with the filter chambers via the filter cloths.

BRIEF DESCRIPTION OF THE DRAWINGS

The above mentioned and other features and objects of this invention will become more apparent by reference to the following description taken in conjunction with the accompanying drawings, in which.

DETAILED DESCRIPTION OF THE INVENTION

Figure 1:
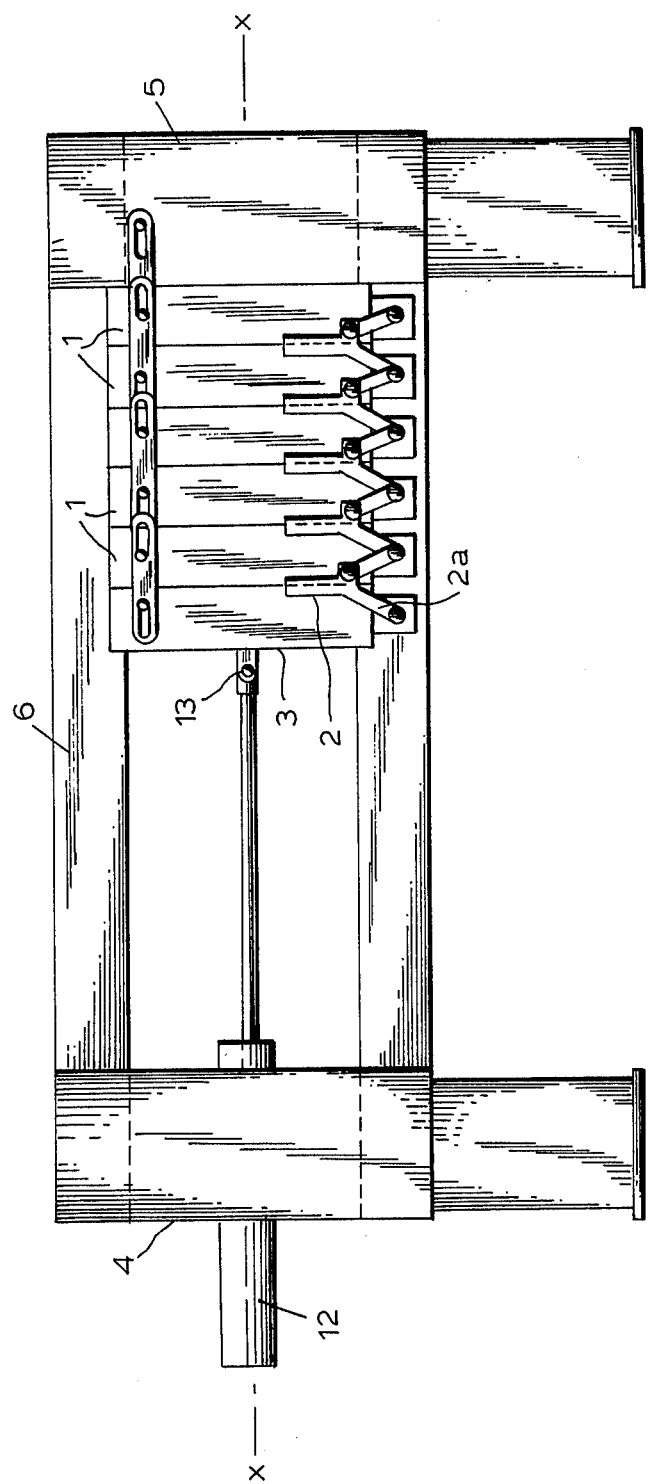
FIG. 1 is a side view of a filter press according to one preferred embodiment of the present invention as represented in its closed state.
Figure 2:
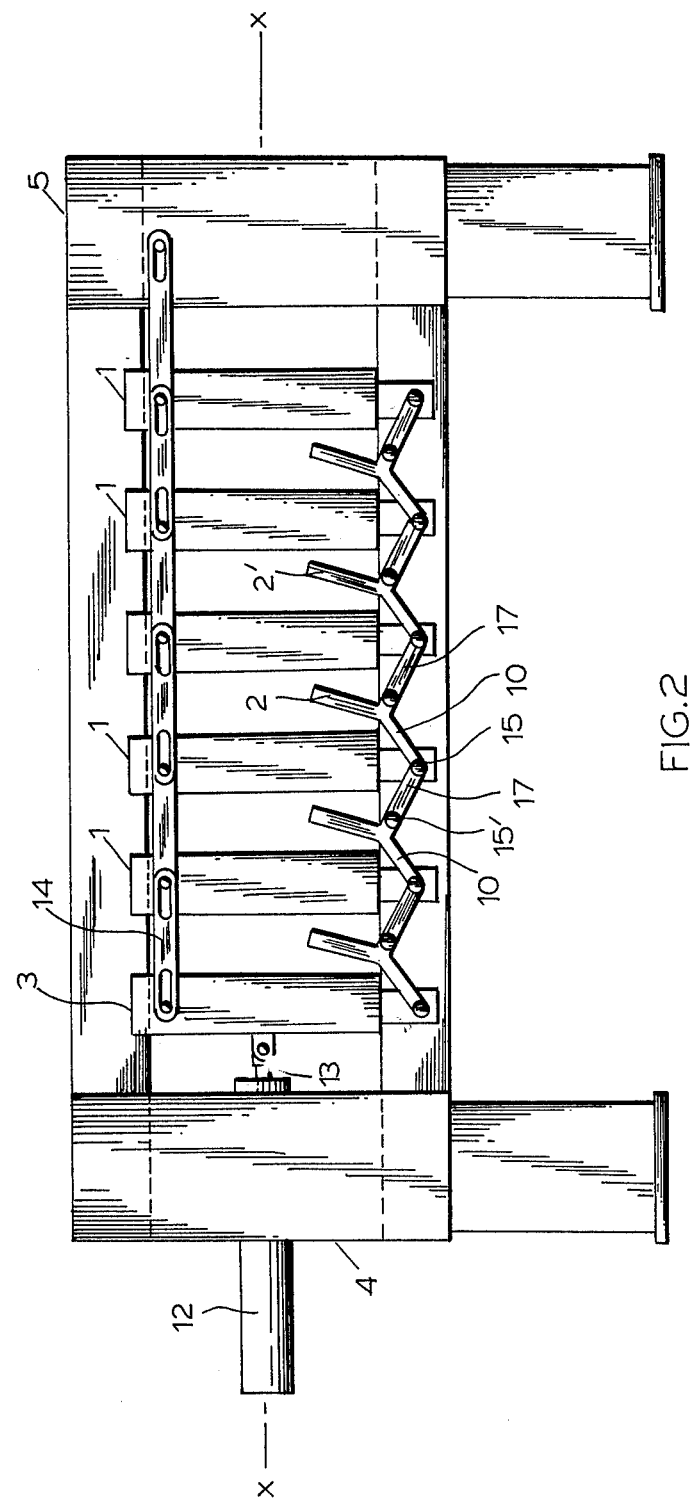
FIG. 2 is a side view of the same similar to FIG. 1 but represented in its opened state.
Figure 3:
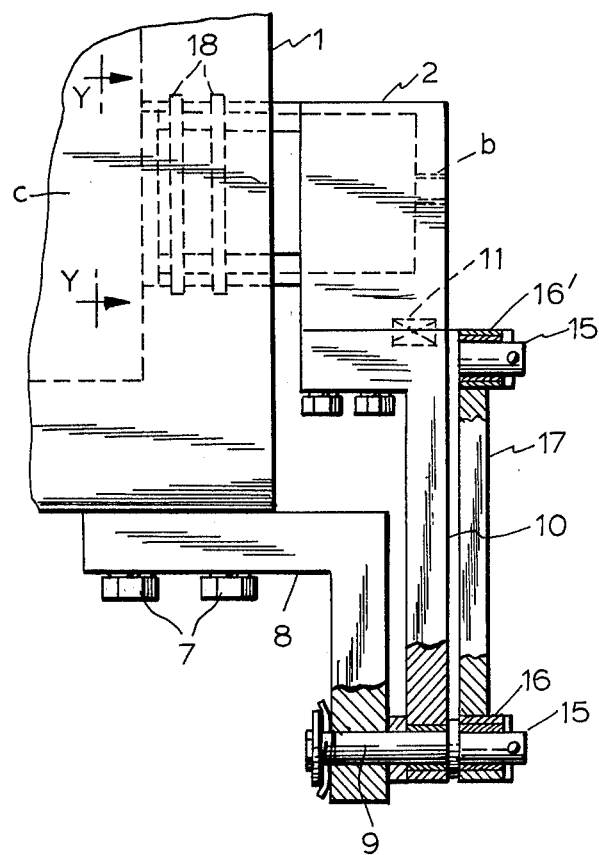
FIG. 3 is an enlarged partial front view partly in cross-section of an essential part of the filter press shown in FIG. 1.
Figure 4:
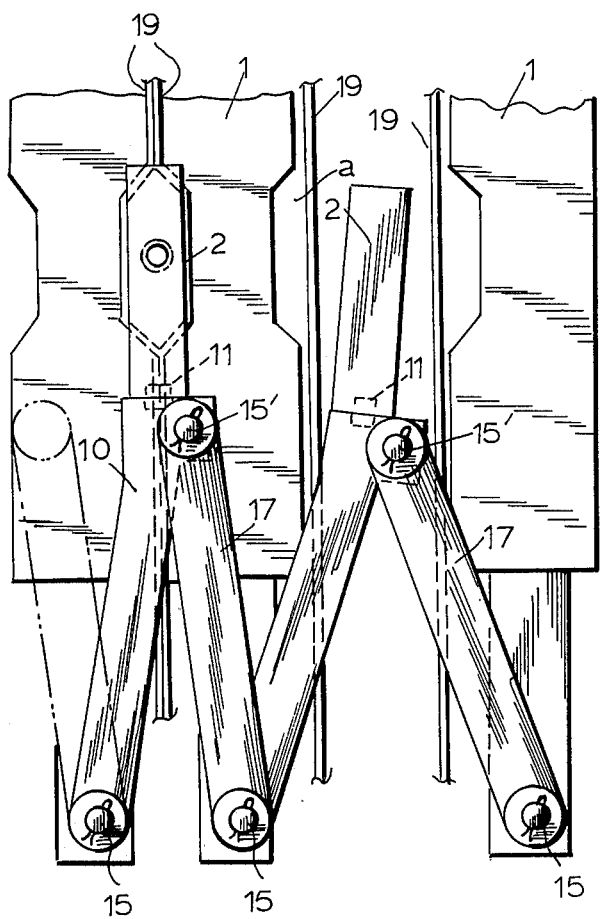
FIG. 4 is a side view of the same essential part as in FIG. 3.
Figure 5:
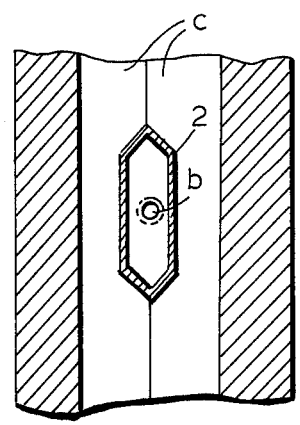
FIG. 5 is a cross-section view taken along line Y—Y in FIG. 3 as viewed in the direction of arrows.

Referring now to the accompanying drawings, a filter press according to one preferred embodiment of the present invention is illustrated in FIG. 1, which shows the filter press in a closed state in which the filter frames 1 and mud-feed metallic members 2 are alternately disposed. In this figure, a movable plate 3 and the filter frames 1 are supported in parallel to each other from an upper tie plate 6 bridged between fixed plates 4 and 5 so that they may be freely moved along the upper tie plate 6 via rollers not shown. As shown in FIGS. 3 to 5 the aforementioned mud-feed metallic member 2 is fixedly secured onto a main link 10 that is rockably mounted via a fixed pin 9 at a tip end of a bracket 8 which is in turn fixedly secured to the filter frame 1 by fastening with bolts 7. Between the main link 10 and the mud-feed metallic member 2 a positioning key 11 is embedded. The relative positioning between the mud-feed metallic members 2 and the filter frames 1 in an opened state is shown in FIG. 2. On the fixed plate 4 a hydraulic cylinder is provided 12 for operating the movable plate 3 (a drive power source for the cylinder being disposed at another position and not shown), and a tip end of a rod of the same cylinder 12 is coupled to the movable plate 3 with a pin 13. Here, starting from the state shown in FIG. 1, if the cylinder 12 is made to contract, the movable plate 3 moves leftwards along the direction X—X, and the filter frames 1 coupled to the same movable plate 3 by links 14 also move leftwards sucessively while maintaining an equal interval therebetween. The mud-feed metallic member 2 is coupled by a pin 9 to the filter frame 1 on one side via the main link 10 fixedly connected to the metallic member 2, and also the same mud-feed metallic member 2 is supported from one end of a follower link 17 via a shaft 15' projecting from the main link 10 and a bush 16'. The other end of this follower link 17 is rockably mounted via a bush 16 on a shaft 15 provided on an extension of the fixed pin 9 of the main link 10 for an adjacent mud-feed metallic member 2 that is coupled with a pin 9 to an adjacent filter frame 1. Accordingly, the mud-feed metallic member 2 would be positioned at the center between adjacent filter frames at an equal interval by opening the angle formed between the main link 10 and the follower link 17, in accordance with the movement of the filter frames 1, and when the press is closed, that is, in the state shown in FIG. 1, the mud-feed metallic member 2 can be smoothly and surely coupled to an insert port *a* for the mud-feed metallic member which port is formed on the side of the filter frame in a recessed shape as shown in FIG. 4, and thus can feed the mud into the insert port *a*. It is to be noted that the above-described links 14 are not limited to the illustrated structure, but chains, ropes or other means can be used so long as they achieve the object of moving the respective filter frames and opening them at equal intervals. In addition, for the purpose of preventing the filter frames 1 from swinging, the same links can be added to the lower portions of the filter frames 1. Further it is to be noted that in FIGS. 3 and 4, reference numeral 18 designates O-rings and numeral 19 designates filter cloths.

Explaining now the operation of the apparatus, during a filtering compression period as shown in FIG. 1, mud transported by means of a mud-feed pump not shown passes through a mud-feed pipe not shown, and is fed from the mud-feed metallic member 2 into a filter chamber c via a known hose connected to a mud-feed port b of the mud-feed metallic member 2. On the other hand, in the inlet port of the filter chamber c, O-rings are mounted around the tip end of the mud-feed metallic member 2, so that the inlet port can be surely sealed by means of the O-rings 18 and the filter cloths 19. Subsequently, when the filtration and compression have been finished and the frame is opened as shown in FIG. 2, the mud-feed metallic member 2 which was directly coupled to the filter frames 1 in the closed state would be positioned at the center between the adjacent filter frames 1 owing to the fact that the angles formed between the main link 10 and the follower link 17 disposed between the adjacent filter frames 1 are equally expanded in accordance with the opening of the filter frames by the actions of the both links 10 and 17.

As fully described above, according to the present invention, the opening and closing of the filter frames can be perfectly correlated to the movement of the mud-feed metallic members, so that upon closing the press, the recessed portion of the filter frame that is communicated with the filter chamber via the filter cloth can be smoothly and surely coupled to the mud-feed metallic member, and upon compressing the mud, the accident of ejecting the mud to the outside as is the case with the prior art filter press, is prevented. In addition, upon opening the press, the mud-feed metallic members is disposed at an equal interval between the filter frames, so that no trouble is given to the running filter cloth and the diaphragm.

Since many changes could be made in the above construction and many apparently widely different embodiments of this invention could be made without departing from the scope thereof, it is intended that all the matter contained in the above description or shown in the accompanying drawings shall be interpreted as illustrative and not as a limitation to the scope of the invention.

What is claimed is:

1. A filter press comprising:
a filter press frame;
at least one pair of parallel filter frames slidably mounted in said frame, a filter chamber being created between said pair of filter frames;
liquid-feed member means between said pair of filter frames for feeding liquid to be processed into said filter chamber between said parallel frames;
pivotable link member means connected to each filter frame of said pair of filter frames and to said liquid-feed member means between said frames for maintaining said liquid-feed member means between said frames when said frames are moved together and apart;
a filter cloth on each side of said liquid-feed member means between said feed member means and said adjacent filter frames; and
moving means connected to said filter frames for sliding said frames together and pulling said frames apart.

2. A filter press as claimed in claim 1, wherein:
each filter frame has a recess therein opposite a recess in the adjacent filter frame, said recesses surrounding said liquid-feed member means when said filter frames are slided together.

* * * * *